March 31, 1942. R. R. ROBERTSON 2,278,023
CONTRACTION JOINT
Filed July 24, 1940 2 Sheets-Sheet 1
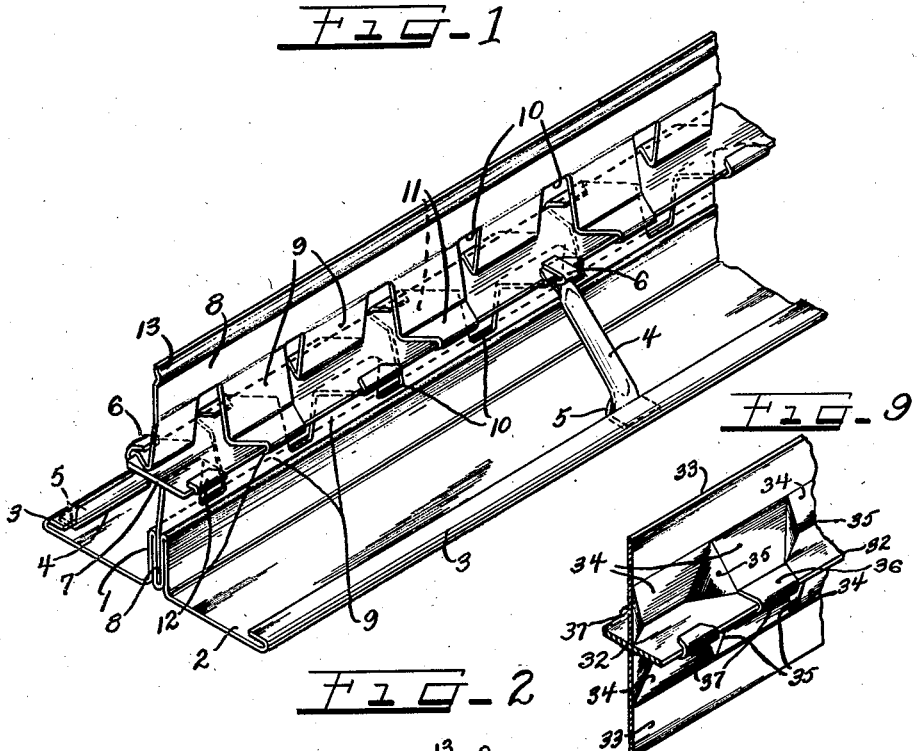
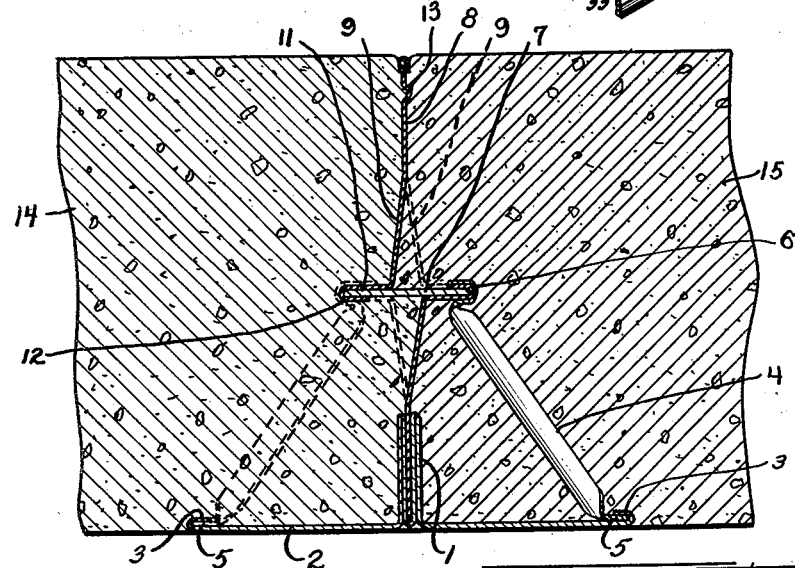
Inventor
Robert R. Robertson.
by Charles Miller Attys

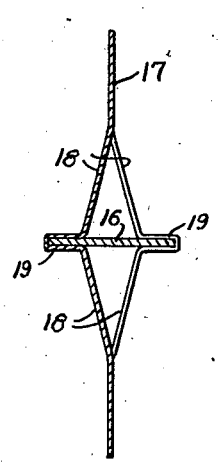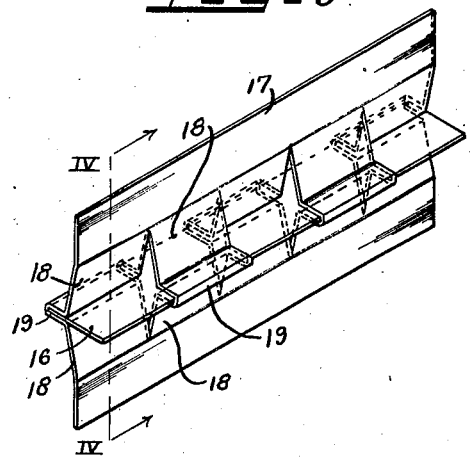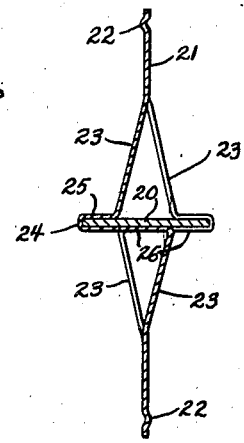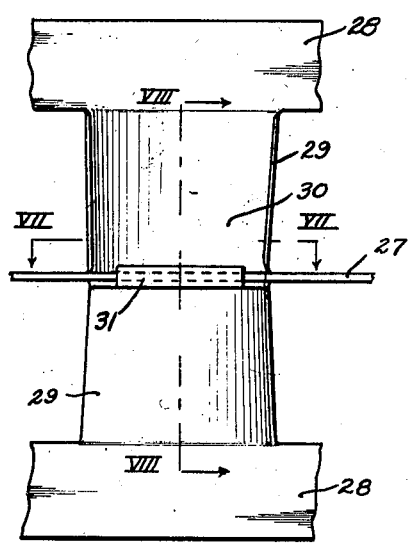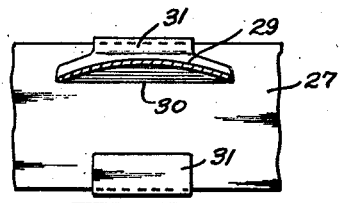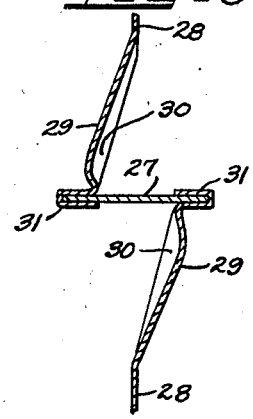

Patented Mar. 31, 1942

2,278,023

UNITED STATES PATENT OFFICE 2,278,023

CONTRACTION JOINT

Robert R. Robertson, Chicago, Ill.

Application July 24, 1940, Serial No. 347,125

6 Claims. (Cl. 94—17)

The present invention pertains to road joints and more particularly to contraction joints adapted to be constructed out of comparatively light weight sheet metal but so constructed that they will be of the required strength. The improved contraction joint includes a transverse seal plate disposed between upper and lower plate sections each of which has staggered or alternately arranged legs or brace panels which are inclined in different directions and terminate in gripping sections engaging opposite edges of the seal plate to securely brace the upper and lower plate sections and connect the same with the seal plate to form a substantially rigid contraction joint even though constructed of comparatively light gauge sheet metal.

The provision of the oppositely inclined leg panels between the upper and lower plate sections and the intermediate or seal plate provides an arrangement whereby concrete which is poured on opposite sides of the joint is adapted to seat in the pockets formed by the inclined leg panels to produce slab constructions adapted to interfit or overlap one another whereby loads applied to the respective slabs may be transmitted from one slab to another through the joint.

It is an object of this invention to provide an improved type of road contraction joint wherein the joint pieces are constructed of relatively thin sheet metal and wherein the intermediate or seal plate forming part of the joint is gripped and held in position between groups of upper and lower staggered inclined leg or brace panels.

It is another object of this invention to provide an improved type of road contraction joint wherein the intermediate or seal plate is gripped and held in position between staggered groups of either flat or dished leg panels arranged in staggered relation on opposite sides of the intermediate seal plate and connected with the upper and lower plate sections of the joint.

It is also an object of this invention to provide an improved type of road contraction joint wherein the main joint plate is formed with guide channels alternately engaging opposite longitudinal marginal portions of an intermediate seal plate which, in turn, is held in spaced relationship between the upper and lower portions of the main seal plate by inclined brace panels of either flat or concave shape, and integrally connected with the guide channels to provide a contraction joint adapted to be constructed of substantially thin gauge sheet metal without sacrificing rigidity of the joint.

A further object of the invention is the provision of an improved and simplified form of road contraction joint constructed of relatively light gauge sheet metal and including a two-piece joint unit consisting of a main plate having the intermediate portion thereof cut and formed to provide alternately positioned connecting strips shaped to provide guides for the seal plate in addition to providing inclined brace panels permitting the concrete on opposite sides of the joint to form overlapping and interfitting road slabs to facilitate the transfer of loads from one road slab to another through the joint and permitting movement of the road slabs and the connecting strip of the main joint plate with respect to the seal plate when contraction of the road slabs take place due to temperature change.

It is furthermore an object of this invention to provide an improved road contraction joint unit of substantially two-piece construction wherein one of the plate members slidably interfits the other plate member and alternately separates adjacent portions thereof to form staggered pockets on opposite sides of the joint unit, permitting the concrete road slabs formed on opposite sides of the joint unit to overlap and interfit one another for the transmission of loads from one road slab to another through the joint unit.

It is furthermore an object of this invention to provide a road contraction joint including a seal plate and a main joint plate positioned at substantially right angles with respect to one another, with said main joint plate shaped to provide connecting strips adapted to cover the major portion of the bottom of the seal plate and a lesser area of the top surface of the seal plate, in addition to providing oppositely inclined leg sections to reinforce the joint to such an extent that the joint may be constructed of a relatively light gauge sheet metal, thereby greatly reducing the cost and weight of the joint.

It is an important object of this invention to provide an improved and simplified form of contraction road joint, adapted to be constructed of comparatively thin sheet metal and including a main joint unit consisting of a seal plate held in position by a main plate formed with oppositely inclined and staggered brace sections including guide portions for engaging the opposite margins of the seal plate, said main joint unit being engageable in a base strip of substantially the length of the joint and including a plurality of inclined brace arms for engaging the joint unit and holding the same in position to facilitate the pouring of concrete on opposite sides of the joint to form interfitting and overlapping road slabs adapted to transmit loads from one slab to the other through the joint.

Other and further important objects of this invention will be apparent from the disclosures in the specification and the accompanying drawings.

The invention (in preferred forms) is illustrated in the drawings and hereinafter more fully described.

In the drawings:

Figure 1 is a fragmentary isometric view of an improved contraction joint embodying the principles of this invention.

Figure 2 is an enlarged fragmentary vertical detail section taken through the joint when embedded between concrete road slabs.

Figure 3 is an isometric view of a modified form of contraction joint unit of a two-piece construction, with the supports omitted.

Figure 4 is an enlarged vertical detail section taken on line IV—IV of Figure 3.

Figure 5 is a vertical sectional view of another modified form of contraction joint unit.

Figure 6 is an enlarged fragmentary elevational view of still another modified form of contraction joint unit wherein the inclined leg panels are concaved or dished.

Figure 7 is a fragmentary horizontal detail section taken on line VII—VII of Figure 6.

Figure 8 is a vertical detail section taken on line VIII—VIII of Figure 6.

Figure 9 is a fragmentary isometric view of still another modified form of contraction joint unit in which the adjacent inclined brace legs are integrally connected by gore plates to cut off contact of the road slabs through the joint unit.

As shown in the drawings:

The improved contraction joint unit forming the main part of this invention is adapted to be constructed of comparatively light gauge sheet metal to reduce the weight and the cost. The contraction joint units are so constructed that even though they are made of light gauge sheet metal, they are sufficiently strong for the purpose designed.

As illustrated in Figures 1 and 2, one form of the contraction joint unit is illustrated with the lower marginal edge of the unit engaged in a supporting channel or holder 1 which is integrally formed longitudinally through the center of a base plate 2 which is adapted to be supported on the road subgrade in position to properly locate the joint transversely of the road which is to be constructed. The longitudinal margins of the base plate 2 are bent upwardly and inwardly to provide U-shaped channels or pockets 3.

To assist in holding the contraction joint unit supported in position upon the base plate 2 which extends throughout the length of the joint unit, a plurality of brace arms 4 are provided each having a flat foot 5 which is adapted to project into one of the pockets 3. Formed on the upper end of each of the brace arms 4 is a substantially dish-shaped gripping head 6 for gripping a portion of the contraction joint unit to brace the same in place. The brace arms 4 are arranged in staggered relationship alternately on opposite sides of the contraction joint unit.

The form of the contraction joint unit as illustrated in Figures 1 and 2 may be constructed of comparatively light weight sheet metal which is stamped and cut, and then formed to provide a three-piece joint unit consisting of an intermediate or seal plate 7 which forms the middle portion of the joint and is held in place by upper and lower sheet metal joint sections.

The upper and lower joint sections each comprises a plate 8 having a longitudinal portion thereof cut out or stamped to provide a plurality of brace or leg panels 9 which are separated by openings 10. The brace panels 9 are alternately inclined downwardly and outwardly in different directions to provide a staggered relationship of the panels to brace the plate 8. Each of the leg panels 9 has integrally formed on the lower end thereof an outwardly projecting flange 11 the end of which is bent or curled downwardly and inwardly to provide a gripping or clamping finger or hook 12 adapted to be engaged around a longitudinal edge of the seal plate 7.

It will be noted that the flanges 11 of adjacent leg panels 9 project in opposite directions and have their clamping hook ends 12 engaged around opposite margins of the seal plate 7 to securely hold the plate members 8 rigidly clamped in position on opposite sides of the intermediate or seal plate 7 to provide a rigid and strong contraction joint unit. If desired, the upper plate 8 may be formed with a reinforcing rib 13 which may extend longitudinally of the plate as shown in Figure 1.

As illustrated in Figure 2, the contraction joint unit is supported on the base and is braced in position by means of the brace arms 4 to permit the entire joint mechanism to be located transversely on a road subgrade to permit concrete to be poured on opposite sides of the joint mechanism to form the concrete road slabs 14 and 15. The concrete is permitted to enter the spaces or pockets provided between the brace or leg panels 9 on each side of each of the upper and lower joint sections so that the road slabs are formed with projections adapted to project beyond the vertical plane of the center of the joint mechanism so that the road slabs actually overlap or interfit one another, separated by the seal plate 7. Portions of the concrete forming the two road slabs project through openings 10 so that the road slabs on opposite sides of the joint mechanism are connected, in the early states of the formation of the road slabs, before cracking of the slabs at the openings, to separate the slabs, takes place.

In order to facilitate the movement of the road slabs with respect to the joint mechanism, due to temperature changes or other causes, the various sheet metal elements comprising the contraction joint unit may be coated or painted with grease or other suitable substance.

Referring now to Figures 3 and 4, a modified two-piece contraction joint unit is disclosed. This modified form of joint unit may be supported on the road subgrade by a base and supporting arms similar to the arrangement illustrated in Figures 1 and 2 or by any other suitable bracing or supporting mechanism. The modified form of joint unit comprises an intermediate or seal plate 16 which forms one member of the unit and which is slidably inserted into position to be supported by the other member of the unit which consists of a main plate 17 which has the middle portion thereof transversely cut at spaced intervals to provide a plurality of connecting strips or panels, with adjacent panels formed to project outwardly in opposite directions to provide a staggered arrangement of intermediate portions of each of which consists of inclined leg panels 18 which are integrally connected by a looped or U-shaped guide channel 19 which provides a horizontal support for the seal plate 16.

Figure 5 illustrates still another modified form of contraction joint unit, of a two-plate construction similar to the joint unit illustrated in Figures 3 and 4, and comprising an intermediate or seal plate 20 and a main plate 21 disposed at substantially right angles thereto and provided with reinforcing ribs or beads 22 when required. The main plate 21 has the intermediate portion thereof transversely cut at spaced intervals to provide a plurality of connecting strips each of which is shaped and formed to provide upper and lower inclined leg panels 23 which are integrally connected by a U-shaped seal plate supporting channel consisting of a bight portion 24 which integrally connects a narrow top plate 25 and a wider lower plate 26 which extends through the middle plane of the joint unit and across the major portion of the bottom of the seal plate 20 to provide a joint unit of great strength and adapted to transmit great loads from one road slab to another through the joint unit.

In the modified form of contraction joint unit illustrated in Figure 5 the road slabs on opposite sides of the joint mechanism are adapted to interfit and overlap one another below and above the seal plate 20.

Referring now to Figures 6, 7 and 8, another modified form of contraction joint unit is illustrated and comprises an intermediate or seal plate 27, and upper and lower joint sections each of which comprises a plate 28 having integrally formed on one longitudinal margin thereof a plurality of staggered and inclined brace or leg panels 29 which are concave or dished to provide recesses or sockets 30 to permit the concrete which forms the road slabs to seat therein and afford a ball and socket type of joint between the overlapping or projecting portions of the road slabs and the dished leg panels 29 of the contraction joint unit.

Each of the inclined brace or leg panels 29 has integrally formed on one margin thereof a channel or U-shaped gripping or clamping foot 31 which engages around one longitudinal margin of the seal plate 27.

The dished construction of the brace or leg panels 29 of the upper and lower joint sections substantially reinforces the leg panels so that the members comprising the contraction joint unit may be constructed of comparatively light weight sheet metal to provide a strong unit of light weight and relatively lower cost. The contraction joint unit, before being embedded between concrete road sections, may be painted or coated with grease or any other suitable substance, to separate the concrete from the metal surfaces of the joint members.

Figure 9 illustrates a fragmentary isometric view of still another modified form of contraction joint unit, adapted to be constructed of comparatively light weight sheet metal and embracing an intermediate or seal plate 32 which is gripped and held in position between upper and lower joint sections. Each of the joint sections comprises a plate 33 having an intermediate portion thereof shaped and expanded to provide alternate or staggered inclined brace plates or leg panels 34 which are integrally connected by triangular shaped gore plates 35 to form a closed joint section which prevents concrete from one side of the joint to flow through and contact the concrete from the opposite side of the joint.

The joint members 34 and 35 form a sort of scalloped arrangement for the support of the plate 33 forming a part of the joint section. Each of the brace plates or leg panels 34 is provided with a foot extension 36 adapted to rest against one surface of the seal plate 32 and the end of the foot piece 36 is bent downwardly and inwardly to provide a clamping hook 37 to engage around a longitudinal margin of the seal plate 32.

The modified form of contraction joint unit illustrated in Figure 9 is of the closed type which prevents the concrete from one side of the joint from passing through the joint and into contact with the concrete from the other side of the joint.

The use of a contraction joint unit such as shown in Figure 9 permits the road slabs on opposite sides of the joint, both above and below the joint seal plate 32, to be formed with alternate projections or teeth end recesses, formed by the scalloped members 34 and 35 to provide a ball and socket-like interfitting arrangement of the overlapping portions of the road slabs, with the interfitting portions being separated by the coated thin sheet metal forming the contraction joint unit.

It will of course be understood that various details of construction may be varied through a wide range without departing from the principles of this invention, and it is, therefore, not the purpose to limit the patent granted hereon otherwise than necessitated by the scope of the appended claims.

I claim as my invention:

1. A road joint for embedding between interfitting concrete road slabs, said joint comprising upper and lower joint blades, a seal plate disposed therebetween, pocket-shaped brace members integrally connected with the upper and lower joint plates and projecting toward the seal plate and contacting the same in staggered relationship to form staggered buttress-like portions on the road slabs, and gripping members formed on the brace plates and engaging around the seal plate on opposite sides thereof to hold the joint plates and the seal plate in assembled relation and allowing a transverse movement of the gripping members with respect to the seal plate with a contraction movement of the road slabs.

2. A road contraction joint for embedding between adjacent concrete road slabs, said joint comprising a seal plate embedded in the concrete to project from one road slab into an adjacent slab, joint plates disposed on opposite sides of the seal plate and formed with inclined staggered brace members to form buttress portions and recesses in adjacent faces of the road slabs permitting an interfitting overlapping relationship of the road slabs through the plane of the joint, said inclined brace members formed with gripping members alternately projecting in opposite directions from the upper and lower joint plates and engaged around the longitudinal margins of said seal plate.

3. A road contraction joint comprising a seal plate, upper and lower joint plates disposed on opposite sides of the seal plate, pocket portions integrally formed on the upper and lower joint plates and contacting opposite sides of the seal plate, and gripping members formed on the pocket portions and alternately engaging around the longitudinal margins of the seal plate.

4. A road contraction joint mechanism for embedding between adjacent concrete road slabs, said joint mechanism comprising a joint unit, a supporting base therebeneath and of substantially the same length as the joint unit, a plurality of brace arms arranged in staggered relation on opposite sides of the joint unit and engaging the joint unit and said base, said joint unit including a main joint plate formed with staggered alternately inclined brace members including gripping portions, and a transverse seal plate both longitudinal margins of which are alternately gripped by the gripping portions of the brace members.

5. A road contraction joint unit comprising a main joint plate having the intermediate portion thereof vertically split to form transverse strips which are alternately bent outwardly in opposite directions and integrally connect the upper and lower portions of the main joint plate, and a seal plate slidably inserted between the alternately deflected strips at right angles to the main joint plate.

6. A contraction joint unit comprising a seal plate, upper and lower plates disposed on opposite sides of the seal plate, a plurality of inclined staggered brace plates formed on the upper and lower joint plates and engaging around both longitudinal margins of the seal plate, and plates formed from the upper and lower joint plates and connecting adjacent brace plates to close the spaces therebetween.

ROBERT R. ROBERTSON.